(12) United States Patent
Gering (10) Patent No.: US 7,623,709 B2
(45) Date of Patent: Nov. 24, 2009

(54) METHOD AND SYSTEM FOR SEGMENTING IMAGE DATA

(75) Inventor: David Thomas Gering, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 798 days.

(21) Appl. No.: 11/220,329

(22) Filed: Sep. 6, 2005

(65) Prior Publication Data

US 2007/0053589 A1 Mar. 8, 2007

(51) Int. Cl.
*G06K 9/34* (2006.01)

(52) U.S. Cl. ........................ 382/173

(58) Field of Classification Search ............ 382/100, 382/108–109, 113, 128, 131, 154, 173, 266, 382/294–296, 305; 345/419–420, 581–587; 707/10; 701/1, 4, 200, 300–301; 709/217, 709/219
See application file for complete search history.

(56) References Cited

U.S. PATENT DOCUMENTS

| 5,751,289 | A | * | 5/1998 | Myers ........................ 345/419 |
| 5,903,664 | A | | 5/1999 | Hartley et al. |
| 6,535,623 | B1 | | 3/2003 | Tannenbaum et al. |
| 6,757,414 | B1 | | 6/2004 | Turek et al. |
| 6,985,929 | B1 | * | 1/2006 | Wilson et al. ............... 709/217 |

OTHER PUBLICATIONS

Cline et al., Three-Dimensional Segmentation of MR Image of the Head Using Probability and Connectivity, *Jrnl of Comp Assisted Tomography*, 14(6): pp. 1037-1045, Nov./Dec., 1990.
A.P. Dempster et al., Maximum Likelihood from Incomplete Data Via the $EM$ Algorithm, Journal of the Royal Statistical Society, Series B (Meth.), vol. 39, No. 1(1977), pp. 1-38.
A.C. Evans et al., 3D statistical neuroanatomical models from 305 MRI volumes, IEEE Xplore 0-7803-1487-5/94$04.00, May 1994, pp. 1813-1817.
A.X. Falcao et al., User-Steered Image Segmentation Paradigms: Live Wire and Live Lane, Graphical Models and Image Processing 60 (Mar. 1998), pp. 233-260.
David T. Gering, Automatic Segmentation of Cardiac MRI, R.E. Ellis and T.M. Peters (Eds.): MICCAI 2003, LNCS 2878, pp. 524-532.
Michael R. Kaus, et al., Automated Segmentation of MR Images of Brain Tumors, Radiology, vol. 218, No. 2, Feb. 2001, pp. 586-591.
R Kikinis et al., A Digital Brain Atlas for Surgical Planning, Model-Driven Segmentation and Teaching, IEEE Trans on Visual & Cmptr Grphcs, vol. 2, No. 3, Sep 1996, pp. 232-241.
K. Van Leemput et al., Automated model-based tissue clarification of MR images of the brain, Technical Report, Katholieke Universiteit Leuven, Mar. 1999, pp. 1-19.

(Continued)

*Primary Examiner*—Jose L Couso
(74) *Attorney, Agent, or Firm*—The Small Patent Law Group; Dean D. Small (57) ABSTRACT

Methods and system for segmenting image data are provided. The method includes fitting a topological atlas to acquired image data and generating spatially varying priors based on the fitted topological atlas. The method further includes segmenting the acquired image data based on the spatially varying priors.

30 Claims, 7 Drawing Sheets

OTHER PUBLICATIONS

M. Lorenzo-Valdes et al., Segmentation of 4D cardiac MR images using a probabilistic atlas and the EM algorithm, Medical Image Analysis 8 (Jul. 2004), pp. 255-265.

K.M. Pohl et al., Incorporating Non-rigid Registration into Expectation Maximization Algorithm to Segment MR images, T. Dohi and R. Kikinis: MICCAI 2002, LNCS 2488, pp. 564-571.

T. Saito et al., New Algorithms for Euclidean Distance Transformation of an n-Dimensional Digitized Picture with appls, Ptrn Recog, vol. 27, No. 11, pp. 1551-1565, May 7, 1994.

S.K. Warfield et al., Adaptive, template moderated, spatially varying statistical classification, Medical Image Analysis 4 (Jul. 2000), pp. 43-55.

W.M. Wells et al., Adaptive Segmentation of MRI data, IEEE Transactions on Medical Imaging, vol. 15, No. 4, Aug. 1996, pp. 429-442.

A. Yezzi et al., A Geometric Snake Model for Segmentation of Medical Imagery, IEEE Transactions on Medical Imaging, vol. 16, No. 2, Apr. 1997, pp. 199-209.

Jun Zhang, The Mean Field Theory in EM Procedures for Markov Random Fields, IEEE Transactions on Signal Processing, vol. 40, No. 10, Oct. 1992, pp. 2570-2583.

* cited by examiner

METHOD AND SYSTEM FOR SEGMENTING IMAGE DATA

BACKGROUND OF THE INVENTION

The invention relates generally to systems for processing image data, and more particularly, to systems for segmenting of image data.

Segmentation of image data includes labeling of image voxels according to the tissue type of each voxel. Segmentation of images in a 2D pixel dataset and in a 3D voxel dataset is needed for analysis of anatomical structures. The difference in the intensity of the image voxels is used to determine the boundary or edges of the image. However, several unknown variables such as tissue type, correlation with neighboring voxels, image non-uniformity, partial volume artifacts and detector noise may create uncertainty in the segmentation process.

Different methods are known for performing segmentation. In one class of methods, a contour-based algorithm is applied to the image data. In a contour-based method, a curve is generated based on internal forces, such as, curvature, and external forces, such as, image gradients. The curve delineates the boundaries of anatomical structures.

In another class of methods, a region-based algorithm is applied to the image data. Some region-based methods identify clusters of pixels/voxels that have some similarity. The image is divided into regions, for each region similarity among pixels/voxels is analyzed. If the similarity level is below a threshold, the region is divided into smaller regions. Neighboring regions with similar features are then merged into a larger region. This process is performed iteratively until there is no more splitting or merging. Other region-based methods use statistical modeling of each tissue class, combined with morphological operations such as smoothing and connectivity. These region-based methods use a Bayesian probabilistic framework. Additionally, extensions of the Bayesian probabilistic framework include mechanisms for providing spatial coherence, such as Markov random fields (MRFs). MRF models can be based on an assumption of piecewise homogeneity of tissues.

Segmentation also may be performed by computing an anatomically correct co-ordinate transformation (registration) between the image and an already segmented atlas image.

These known algorithms often do not provide satisfactory results in clinical settings. Thus, human intervention is often required to extract clinically meaningful results. This results in a tedious process with an increased likelihood of error (e.g., human error). Further, the process can be very time consuming.

BRIEF DESCRIPTION OF THE INVENTION

In one exemplary embodiment, a method for segmenting image data is provided. The method includes fitting a topological atlas to acquired image data and generating spatially varying priors based on the fitted topological atlas. The method further includes segmenting the acquired image data based on the spatially varying priors.

In another exemplary embodiment, an imaging system is provided. The imaging system includes an image acquisition component configured to acquire image data. The imaging system further includes an image processing component configured to iteratively fit a topological atlas to the acquired image data, generate spatially varying priors based on the fitted topological atlas, and segment the acquired image data based on the spatially varying priors.

DETAILED DESCRIPTION OF THE INVENTION

Various embodiments of the invention provide a method and system for segmenting image data. In an embodiment of the invention, the image data defines a medical image, which may be derived from a variety of medical imaging modalities such as, for example, Magnetic Resonance Imaging (MRI), Computed Tomography (CT), Single Photon Emission Computed Tomography (SPECT), and Positron Emission Tomography (PET).

Figure 1:
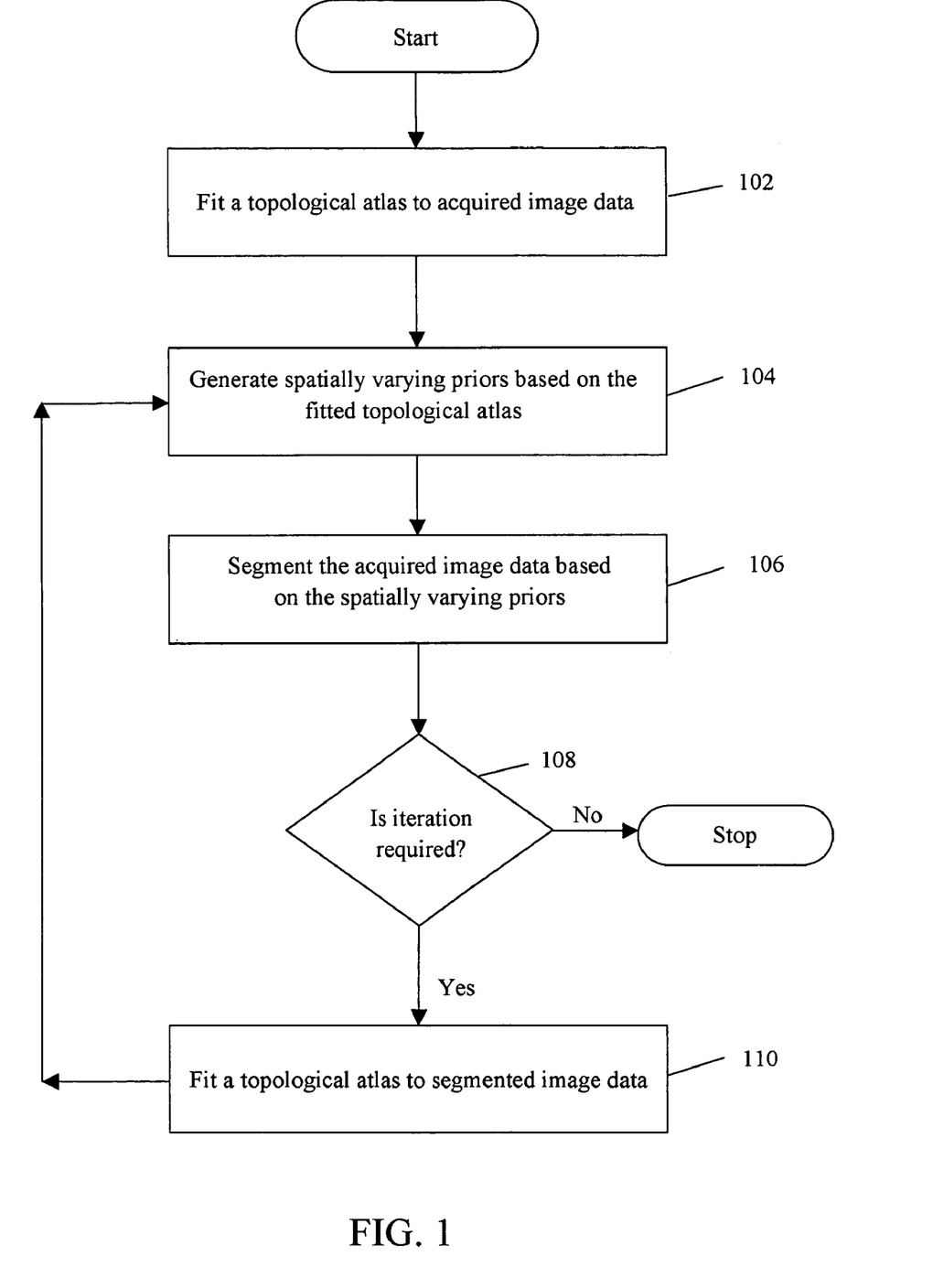
FIG. 1 is a flowchart illustrating a method for segmenting image data in accordance with an exemplary embodiment of the invention.

FIG. 1 is a flowchart illustrating a method for segmenting image data in accordance with an exemplary embodiment of the invention. At 102, a topological atlas is fitted to the acquired image data. In various embodiments of the invention, the acquired image data may be two-dimensional (2-D) slice image data or three-dimensional (3-D) volume image data or four-dimensional (4-D) dynamic data (volumes at various time-points). The 2-D slice image data includes picture elements commonly referred to as 'pixels'. The 3-D volume image data includes surface or volume elements commonly referred to as 'voxels'. In an embodiment of the invention, the acquired image data is derived from CT data. In another embodiment of the invention, the acquired image data is derived from MRI data. In yet another embodiment, the acquired image data includes cardiac imaging data.

The topological atlas comprises a plurality of structures, wherein each structure corresponds to a simple shape such as, for example, a circle, an ellipse, a hyperbola, and a triangle. The structure is described as a set of vectors referenced to a particular point, for example, the center point of the anatomical region. The set of vectors may include, for example, annuli center points and radii. In various embodiments of the invention, the topological atlas approximates the shape of the anatomical region captured in the image data. The topological atlas may be initialized based on user input. The user may use a computer input device, such as a mouse, a stylus or a touch screen, to click anywhere on the acquired image data. Initialization can include, for example, identifying the center, or extent, or shape of the anatomical structures. In another embodiment of the invention, the topological atlas is selected from a set of predefined topological atlases. The predefined topological atlases may include patient dependent topological atlases.

In various embodiments of the invention, the topological atlas is divided into atlas components. For example, topological atlas for fitting to a left ventricle image is divided into a set of concentric annuli, which includes an inner disc for blood, outer annuli for myocardium and another outer annuli for air.

At 104, Spatially Varying Priors (SVPs) are generated based on the fitted topological atlas. The role of the SVP can be understood from the definition of a Bayesian framework. A Bayesian framework is a probabilistic framework, in which, given a set of competing hypotheses, h, and a set of data, D, a hypothesis, $h_{MAP}$ is selected, which best fits the data by computing the 'Maximum A Posteriori Probability' (MAP). Applying Baye's rule, the A Posteriori probabilities are decomposed into pairs of 'likelihoods', p(D|h), and 'a priori probabilities', p(h). The likelihoods express the odds or likelihoods of observing certain data, given that a specific hypothesis is true. The priors express what is known prior to observing the data, D. Both the likelihoods and the priors can be estimated from a set of training data. Therefore, in the Bayesian framework, unknown A Posteriori probability is replaced with the product of the likelihoods and a priori probabilities, represented by the following equation:

$$h_{MAP} = \arg\max_{h \in H} p(D \mid h) p(h) \qquad (1)$$

Prior probabilities express the odds of finding each tissue type independent of the image data. Spatially Varying Priors (SVPs) express this in a manner that allows the probability values to vary with spatial location within the image. In various embodiments of the invention, the topological atlas is incorporated into the Bayesian framework by utilizing the topological information to adaptively compute the SVPs. The SVPs are computed from the topological atlas by smoothing each atlas component, and then normalizing in order to force the summation to result to one, thereby satisfying the definition of a probability.

In an embodiment of the invention, the Bayesian classification may employ Markov random fields (MRFs) to provide spatial coherence. MRFs allow a single pixel's/voxel's classification to be influenced by the classifications of a plurality of neighboring pixels/voxels. Various embodiments of MRFs can differ in whether the classification of a given pixel/voxel is impacted directly, or its computed Bayesian tissue class probabilities are impacted instead. Various embodiments of MRFs can differ in whether the neighboring pixels'/voxels' classifications are considered or their computed Bayesian probabilities instead. Commonly used solutions to these choices are regarded as the optimization methods of Iterated Condition Modes (ICM) and Mean-Field (MF) approximations. In yet another embodiment of the invention, the MRF optimization method may be approximated by a multi-scale method. The multi-scale method alleviates a need to access a plurality of neighboring pixels/voxels surrounding every pixel/voxel location. Segmentation is first performed at a coarse scale, and then repeated at full resolution. For each pixel/voxel at full resolution, inputs from neighbors or adjacent elements are replaced by the computed results at a courser scale. For example, the inputs from neighbors may be replaced by the a posteriori probability of the single pixels's/voxel's location at another level of scale space.

In an embodiment of the invention, a Region of Interest (ROI) is determined from the SVPs, which are adaptively computed form the topological atlas. The ROI is determined as a binary map that is labeled true everywhere, except for pixels/voxels where the probability maps of all the SVPs have a value 0. The ROI is applied to restrict the amount of computation.

In various embodiments of the invention, morphological operations such as erosion, dilation, interior island removal, and exterior island removal are performed to regularize, or smooth, structural boundaries within the determined ROI. In an embodiment of the invention, islands (groups of contiguous segmented labels) are extracted and a correspondence between a given island and structures in the topological atlas is computed. Based on this correspondence, the morphological operations can then be relational such that the morphological operations are applied to specific structural boundaries, rather than all boundaries within the determined ROI. For example, in imaging a left ventricle, relational morphological operations are used to regularize the epicardium (outer wall), while preserving the endocardium (inner wall).

At 106, the acquired image data is segmented based on the SVPs. In an embodiment of the invention, an iterative scheme known as Expectation Maximization (EM) is employed to perform the segmentation of the acquired image data. EM is a technique that simultaneously evolves a model for use in performing the segmentation, and performs the segmentation using the current model during the evolution. The evolved model may express a set of parameters for a bias field estimation to correct inhomogeneity during the segmentation of the acquired image data. Further, the model parameters may describe the probability density functions for tissue class intensity models, such as, means and variances of Gaussian distributions. Further, the model parameters may describe the potential functions used by MRFs to model spatial coherence.

In various embodiments of the invention, the segmentation is modified by receiving user input. The user input may be received in the form of clicks using a computer input device such as a mouse or a stylus or a touch screen. Modification can include drawing a polygon that describes a region of an anatomical structure, or drawing lines that extend the boundaries of the structure, or drawing points such that a distance transform can be computed for the clicked points. The computed distance transform is added to the distance transforms for each structure in the topological atlas. The resultant summation bridges the gap between the clicked points and the topological atlas. Thus, the topological atlas boundaries may be shifted according to the user's definition of boundaries.

In various embodiments of the invention, the segmentation results are displayed in real time. In an embodiment of the invention, the segmentation results are displayed in the form of 2-D slice images. In another embodiment of the invention, the segmentation results are displayed in the form of 3-D surface or volume rendering images. In yet another embodiment of the invention, the segmentation results may be displayed in the form of 4-D images having an array of displays, or by having a cine loop within a display.

At 108, a determination is made as to whether further iteration is needed to improve the segmentation results (e.g., reach a predetermined threshold). If yes, then at 110, the topological atlas is fitted to the segmented image data in order to repeat the steps of generating spatially varying priors and segmenting. Further, the topological atlas is varied during each iteration. If not, then the process ends. Therefore, in various embodiments of the invention, the method for segmenting image data is performed iteratively.

Thus, Spatially Varying Priors (SVPs) are generated based on a topological atlas using an iterative construction process. The topological atlas may be registered to a prior iteration of the construction process. In an embodiment of the invention, a user input may be received for use during iteration of the construction process.

The method according to various embodiments of the invention is now illustrated with respect to an image of a left ventricle. However, this example is for illustrative purposes only, and the various embodiments may be used in connection with imaging different objects.

Figure 2:
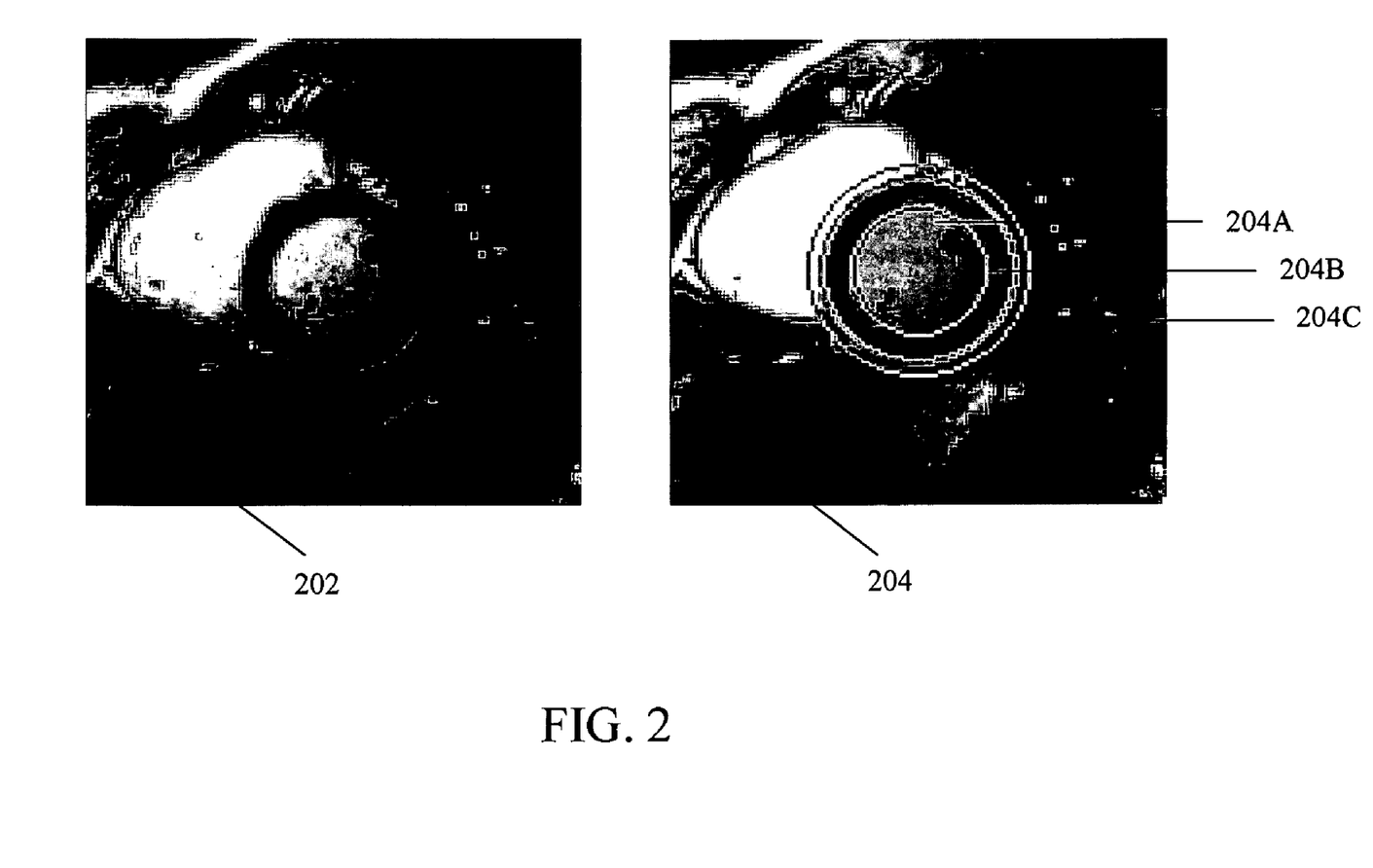
FIG. 2 is an illustration showing the fitting of a topological atlas to an image of a left ventricle in accordance with an exemplary embodiment of the invention.

FIG. 2 is an illustration showing the fitting of a topological atlas to an image of a left ventricle in accordance with an exemplary embodiment of the invention. Image 202 illustrates an input cardiac image. Image 204 illustrates the short-axis, cross-sectional slices of the left ventricle, which conforms to the topology of a set of concentric annuli including an inner disc for blood 204A, outer annuli for myocardium 204B and another outer annuli for air 204C.

Figure 3:
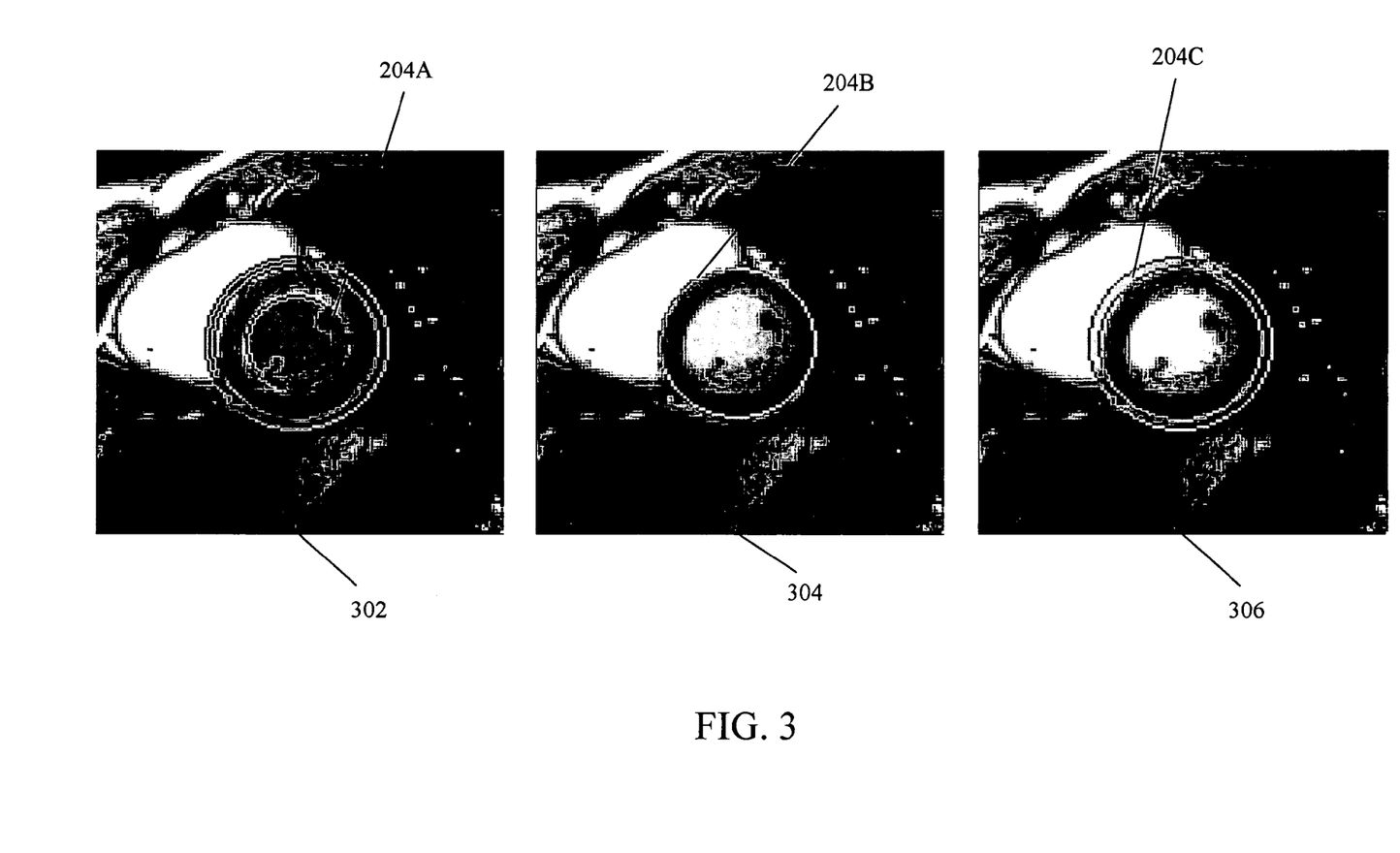
FIG. 3 is an illustration showing the constituents of the topological atlas fitted to the image of a left ventricle in accordance with an exemplary embodiment of the invention.

FIG. 3 is an illustration showing the constituents of the topological atlas fitted to the image of a left ventricle in accordance with an exemplary embodiment of the invention. Image 302 illustrates the blood topology of the left ventricle. Image 304 illustrates the myo-topology of the left ventricle. Image 306 illustrates the air topology of the left ventricle.

Figure 4:
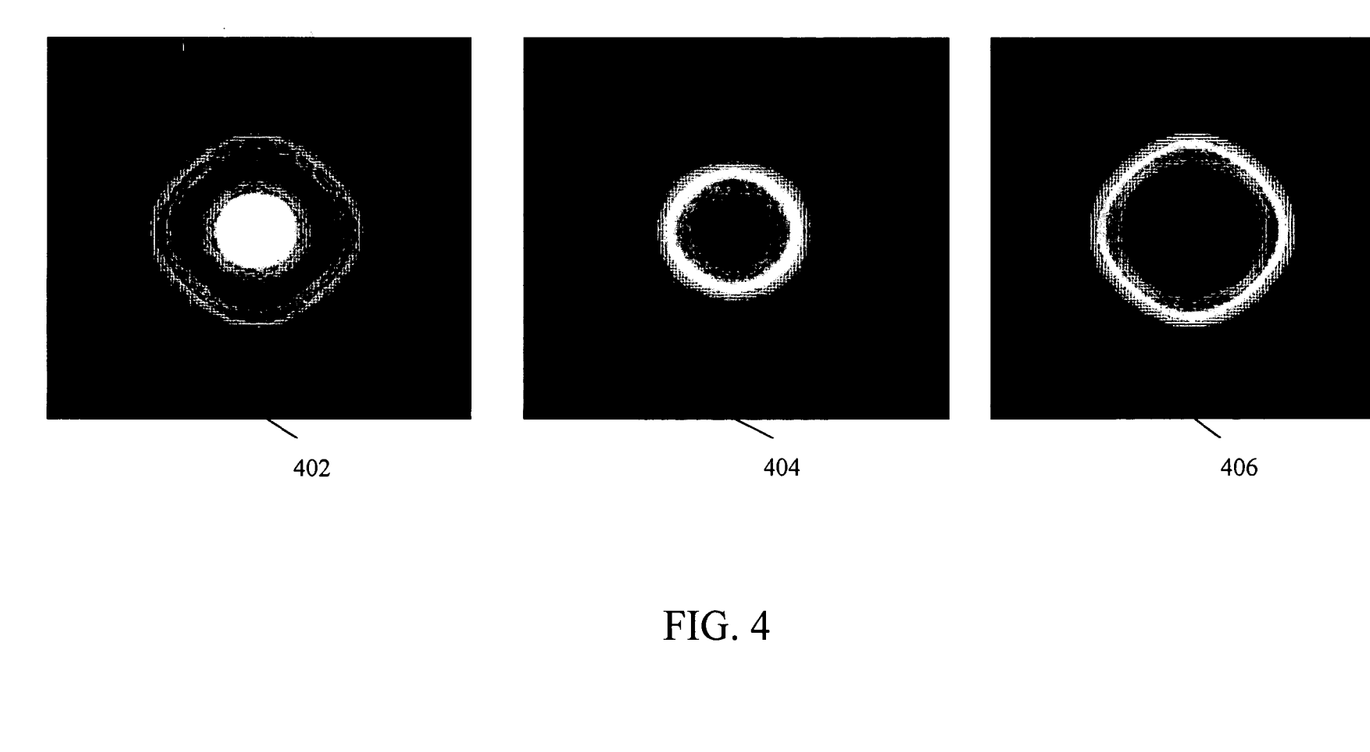
FIG. 4 is an illustration showing Spatially Varying Priors (SVPs) generated from the fitting of the topological atlas in accordance with an exemplary embodiment of the invention.

FIG. 4 is an illustration showing the SVPs generated using fitting of the topological atlas in accordance with an exemplary embodiment of the invention. In an embodiment of the invention, SVPs are computed from the topological atlas by smoothing each atlas component and summing the results to sum to one. Image 402 illustrates the SVPs generated based on blood topology of the left ventricle. Image 404 illustrates the SVPs generated based on myo-topology of the left ventricle. Image 406 illustrates the SVPs generated based on air topology of the left ventricle. In image 402, the dark region indicates a low probability of the presence of blood and the light region indicates a high probability of the presence of blood. In image 404, the dark region indicates a low probability of the presence of myocardium and the light region indicates a high probability of the presence of myocardium. In image 406, the dark region indicates a low probability of the presence of air and the light region indicates a high probability of the presence of air.

Figure 5:
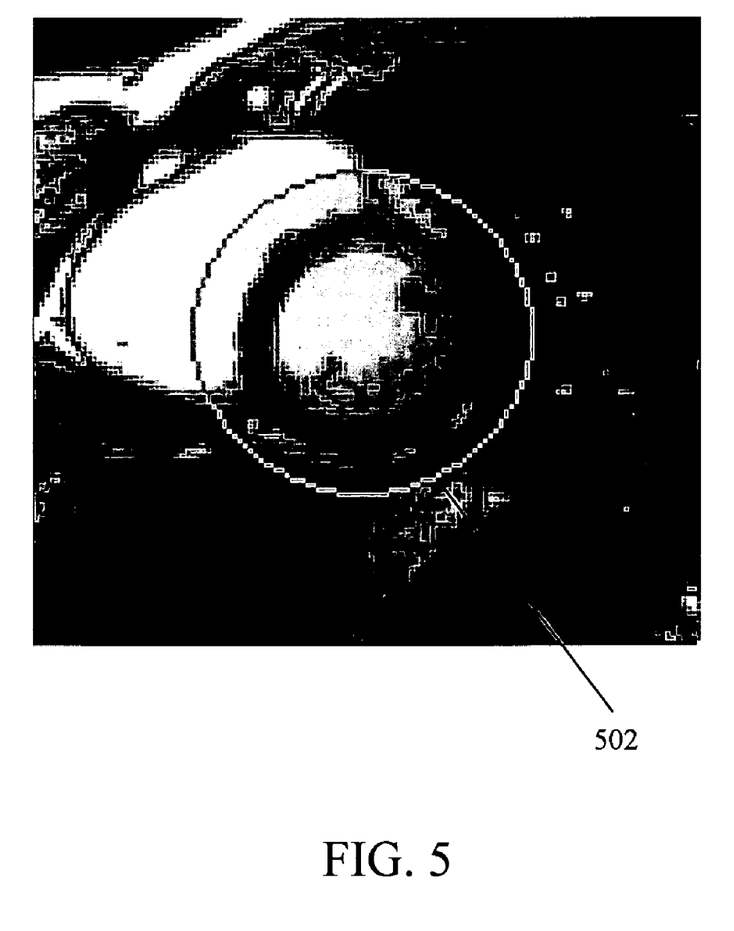
FIG. 5 is an illustration showing a determined Region of Interest (ROI) for left ventricle generated from the fitting of the topological atlas in accordance with an exemplary embodiment of the invention.

FIG. 5 is an illustration showing a determined Region of Interest (ROI) for left ventricle in accordance with an exemplary embodiment of the invention. Image 502 illustrates the ROI determined for left ventricle. In an embodiment of the invention, the ROI is determined as a binary map that is labeled true everywhere, except false wherever all probability maps of the SVP have value 0.

Figure 6:
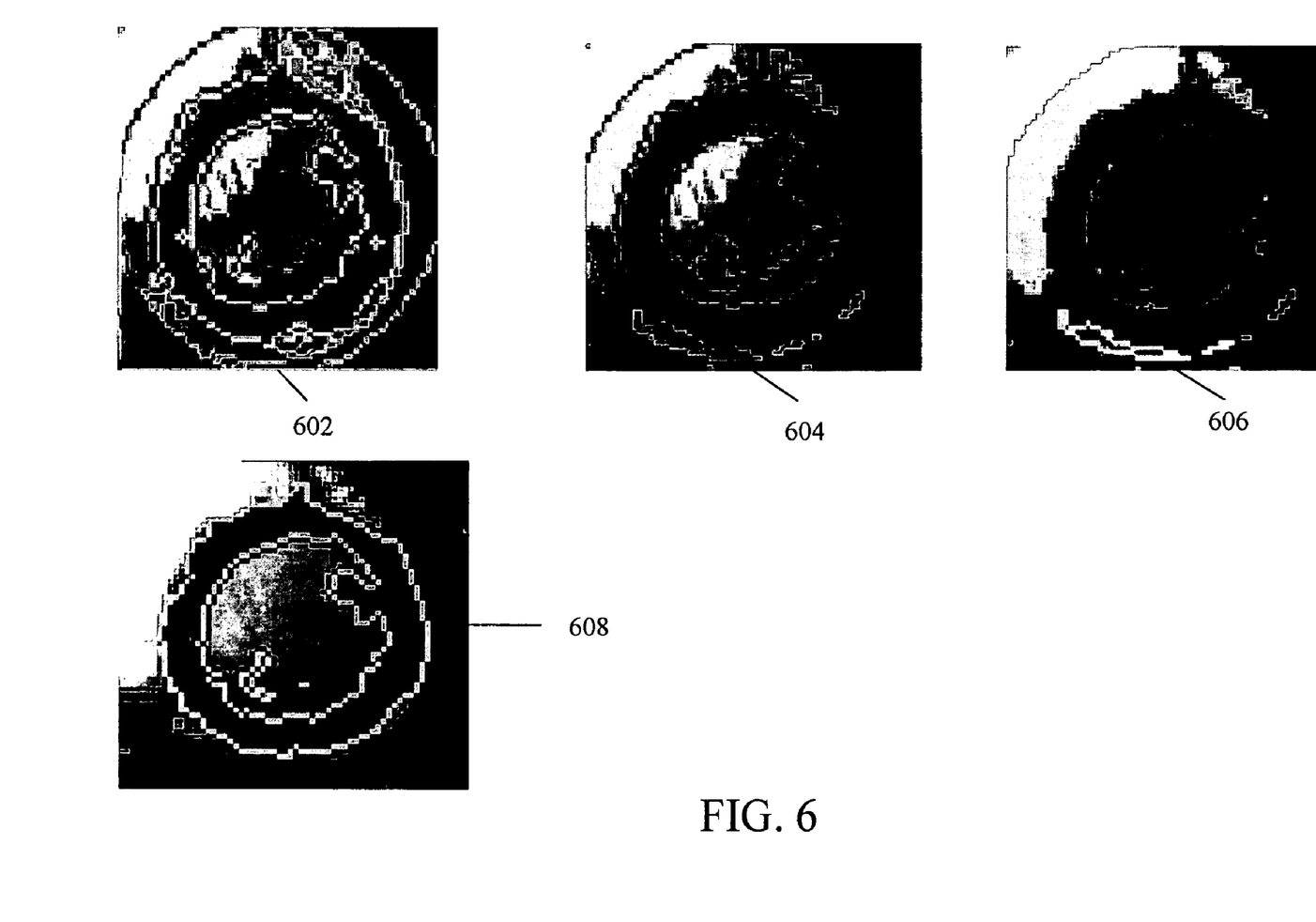
FIG. 6 is an illustration showing an identified region in accordance with an exemplary embodiment of the invention.

FIG. 6 is an illustration showing an identified region in accordance with an exemplary embodiment of the invention. Image 602 illustrates an original output for a cardiac image. Image 604 illustrates blood extraction from the original output for cardiac image. Image 606 illustrates left ventricle island identification. In an embodiment of the invention, relational morphological operations are used to regularize the epicardium (outer wall), while preserving the endocardium (inner wall). Image 608 illustrates the results obtained when relational morphological operations such as erosion, dilation, interior island removal, and exterior island removal are applied to specific structural boundaries of the original output for cardiac image, rather than all boundaries.

Figure 7:
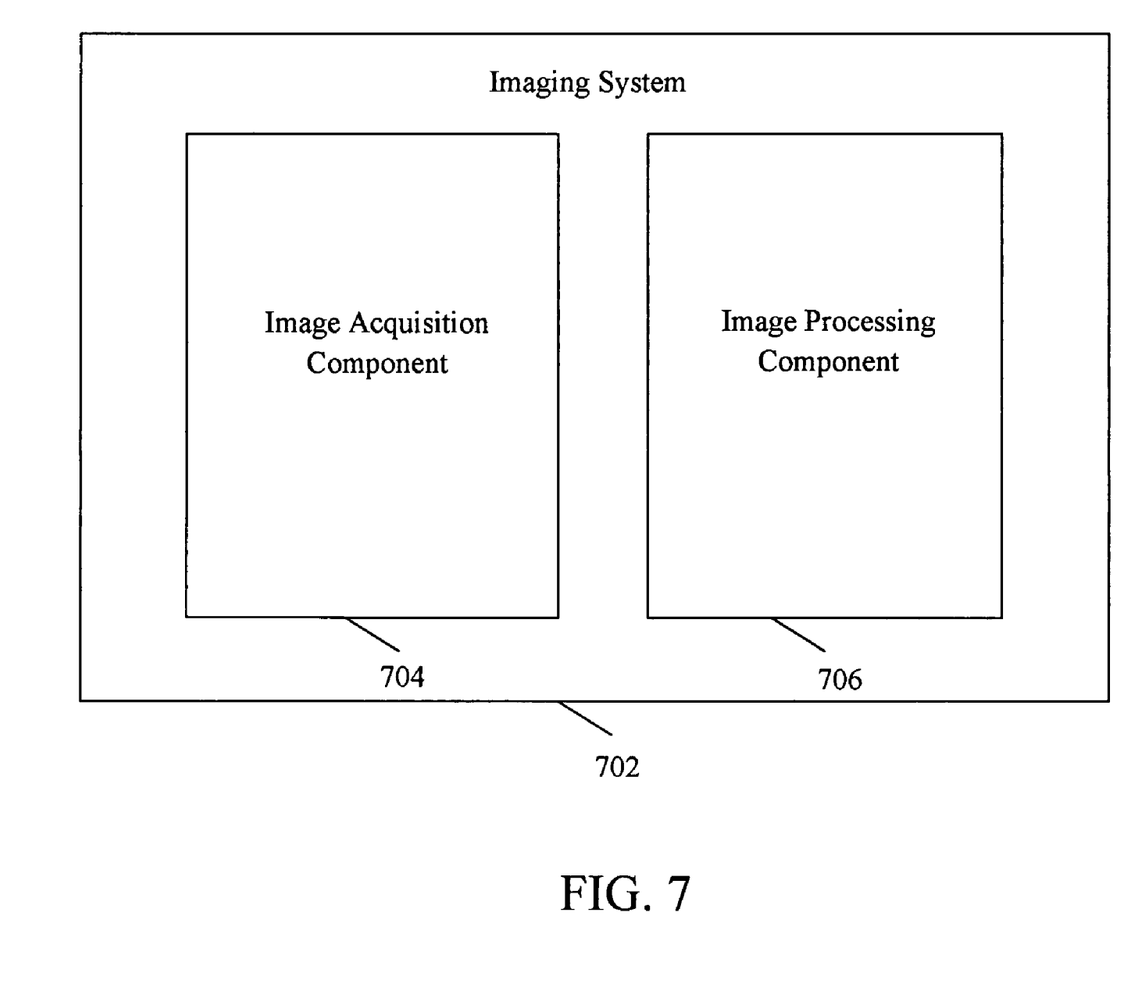
FIG. 7 is a block diagram of an imaging system in accordance with an exemplary embodiment of the invention.

FIG. 7 is a block diagram of an imaging system 702 in accordance with an exemplary embodiment of the invention. Imaging system 702 includes an image acquisition component 704 and an image processing component 706.

Image acquisition component 704 is configured to acquire image data. In an embodiment of the invention, the image data defines a medical image, which may be derived from a variety of medical imaging modalities such as Magnetic Resonance Imaging (MRI), Computed Tomography (CT), Single Photon Emission Computed Tomography (SPECT), and Positron Emission Tomography (PET). Image processing component 706 is configured to iteratively fit a topological atlas to the acquired image data, generate SVPs based on the fitted topological atlas and segment the acquired image data based on the SVPs as described herein. In an embodiment of the invention, the image processing component 706 is configured to perform the method described with reference to FIG. 1.

The various embodiments of the invention provide an imaging system that enables human-computer interaction during segmentation of an image data. Further, the efficiency of segmentation allows the interaction to occur in real time. This facilitates faster and more accurate image segmentation in clinical situations where variability is caused due to patient health, patient movement, pathology, and imaging artifacts.

A technical effect of the various embodiments of the invention is to enable fast and easier segmentation of image data. This alleviates a need for registration of a geometric atlas during segmentation of image data.

Another technical effect of the various embodiments of the invention is to enable adapting of the SVP to the fitted topological atlas. This overcomes registration and initialization errors during the segmentation of image data. Yet another technical effect of the various embodiments of the invention is to enable use of a topological atlas for implementing relational morphological operations to specific structural boundaries rather than all the boundaries of the image. Still another technical effect of the various embodiments of the invention is to enable incorporation of a user input for updating a topological atlas and subsequently the SVP.

The various embodiments or components thereof may be implemented as part of a computer system. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device can also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the invention has been described in terms of various specific embodiments, those skilled in the art will recognize that the invention can be practiced with modification within the spirit and scope of the claims.

What is claimed is:

1. A method for segmenting image data, the method comprising:
    fitting a topological atlas to acquired image data using an image processor;
    generating spatially varying priors based on the fitted topological atlas; and
    segmenting the acquired image data based on the spatially varying priors.

2. A method in accordance with claim 1 further comprising iteratively performing the fitting, generating and segmenting.

3. A method in accordance with claim 1 further comprising selecting a topological atlas.

4. A method in accordance with claim 1 further comprising smoothing each of a plurality of atlas components to generate the spatially varying priors.

5. A method in accordance with claim 1 further comprising dividing the topological atlas into atlas components.

6. A method in accordance with claim 1 further comprising determining a region of interest based on the spatially varying prior.

7. A method in accordance with claim 1 further comprising updating the topological atlas based on a user input.

8. A method in accordance with claim 1 wherein the fitting comprises initializing the topological atlas based on a user input.

9. A method in accordance with claim 1 further comprising using expectation maximization to perform the segmenting.

10. A method in accordance with claim 1 further comprising performing morphological operations on a region of interest and wherein the region of interest is defined by the topological atlas and segmentation.

11. A method in accordance with claim 1 further comprising displaying segmentation results in real time.

12. A method in accordance with claim 11 wherein the displayed segmentation results comprise one of two-dimensional slice images and three-dimensional surface or volume rendering images.

13. A method in accordance with claim 1 wherein the acquired image data comprises cardiac imaging data.

14. A method in accordance with claim 1 wherein the acquired image data comprises one of computed tomography (CT) and magnetic resonance imaging (MRI) data.

15. A method in accordance with claim 1 further comprising receiving a user input to modify the segmentation.

16. A method in accordance with claim 1 further comprising varying the topological atlas during each of a plurality of iterations.

17. A method in accordance with claim 1 wherein the topological atlas comprises a patient dependent atlas.

18. A method for segmenting image data, the method comprising:
    generating a spatially varying prior based on a topological atlas using an iterative construction process using an image processor; and
    registering the topological atlas to a prior iteration of the construction process.

19. A method in accordance with claim 18 further comprising receiving a user input for use during at least one iteration of the construction process.

20. An imaging system comprising:
    an image acquisition component configured to acquire image data; and
    an image processor configured to iteratively:
        fit a topological atlas to the acquired image data;
        generate spatially varying priors based on the fitted topological atlas; and
        segment the acquired image data based on the spatially varying priors.

21. A computer readable storage medium for directing an imaging system processor, the computer readable storage medium comprising instructions to direct the imaging system processor to:
    acquire image data from an image acquisition component; and
    utilize an image processing component configured to iteratively:
        fit a topological atlas to the acquired image data;
        generate spatially varying priors based on the fitted topological atlas; and
        segment the acquired image data based on the spatially varying priors.

22. A computer readable storage medium in accordance with claim 21 wherein the instructions further direct the imaging system processor to incorporate the topological atlas into a Bayesian framework to adaptively compute the spatially varying priors.

23. A computer readable storage medium in accordance with claim 21 wherein the instructions further direct the imaging system processor to:
    smooth each of a plurality of atlas components to generate the spatially varying priors; and
    normalize the spatially varying priors to force a summation to result to one.

24. A computer readable storage medium in accordance with claim 21 wherein the instructions further direct the imaging system processor to iteratively perform the fitting, generating and segmenting.

25. A computer readable storage medium in accordance with claim 21 wherein the instructions further direct the imaging system processor to determine a region of interest in a medical image based on the spatially varying prior.

26. A computer readable storage medium in accordance with claim 21 wherein the instructions further direct the imaging system processor to use an expectation maximization to segment the acquired image data.

27. A computer readable storage medium in accordance with claim 21 wherein the instructions further direct the imaging system processor to vary the topological atlas during each of a plurality of iterations.

28. An imaging system in accordance with claim 20 wherein the imaging system comprises a medical diagnostic imaging system.

29. An imaging system in accordance with claim 20 wherein the image processor is further configured to incorporate the topological atlas into a Bayesian framework to adaptively compute the spatially varying priors.

30. An imaging system in accordance with claim 20 wherein the image processor is further configured to smooth each of a plurality of atlas components to generate the spatially varying priors, and normalize the spatially varying priors to force a summation to result to one.

* * * * *

UNITED STATES PATENT AND TRADEMARK OFFICE
CERTIFICATE OF CORRECTION

PATENT NO. : 7,623,709 B2
APPLICATION NO. : 11/220329
DATED : November 24, 2009
INVENTOR(S) : David Thomas Gering It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 987 days.

Signed and Sealed this

Twenty-sixth Day of October, 2010

David J. Kappos
*Director of the United States Patent and Trademark Office*